US012782943B1

(12) United States Patent
Karnick et al.

(10) Patent No.: US 12,782,943 B1
(45) Date of Patent: Nov. 3, 2026

(54) METHODS AND SYSTEMS FOR CONTROLLING TRIM RATE OF TRIMMABLE MARINE DEVICES WITH RESPECT TO A MARINE VESSEL

(71) Applicant: Brunswick Corporation, Mettawa, IL (US)

(72) Inventors: Kyle F. Karnick, Fond du Lac, WI (US); Andrew J. Przybyl, Berlin, WI (US); Steven M. Anschuetz, Richland, MI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/982,502

(22) Filed: Dec. 16, 2024

Related U.S. Application Data

(63) Continuation of application No. 17/585,273, filed on Jan. 26, 2022, now Pat. No. 12,204,345, which is a continuation of application No. 16/731,803, filed on Dec. 31, 2019, now Pat. No. 11,262,767.

(51) Int. Cl.
*G05D 1/00* (2024.01)
*B63H 20/10* (2006.01)

(52) U.S. Cl.
CPC ......... *G05D 1/0875* (2013.01); *B63H 20/106* (2013.01); *G05D 1/0088* (2013.01)

(58) Field of Classification Search
CPC .... G05D 1/0875; G05D 1/0088; B63H 20/08; B63H 20/106
See application file for complete search history.

(56) References Cited

U.S. PATENT DOCUMENTS

| | | | |
|---|---|---|---|
| 4,318,699 A | 3/1982 | Wenstadt et al. | |
| 4,490,120 A | 12/1984 | Hundertmark | |
| 4,749,926 A | 6/1988 | Ontolchik | |
| 4,776,818 A | 10/1988 | Cahoon et al. | |
| 4,861,292 A | 8/1989 | Griffiths et al. | |
| 6,007,391 A | 12/1999 | Eilert | |
| 7,347,753 B1 | 3/2008 | Caldwell et al. | |
| 7,416,456 B1 | 8/2008 | Gonring et al. | |
| 7,942,711 B1 * | 5/2011 | Swan | B63B 39/061 440/61 G |
| 8,457,820 B1 | 6/2013 | Gonring | |
| 9,381,989 B1 | 7/2016 | Poirier | |

(Continued)

OTHER PUBLICATIONS

European search report dated May 20, 2021 in counterpart European Patent Application 20217834.9.

*Primary Examiner* — Aaron L Troost
(74) *Attorney, Agent, or Firm* — Andrus Intellectual Property Law, LLP

(57) ABSTRACT

A method of controlling trim position of a trimmable device on a marine vessel includes determining a trim rate based on a rotational speed of a propulsion device on the marine vessel and/or a vessel speed of the marine vessel, wherein trim rate specifies a rate of rotation of the trimmable device about a horizontal axis. The trim rate is determined such that the rate of rotation is less at high vessel speeds and high rotational speeds than the rate of rotation at low vessel speeds and low rotational speeds. A variable speed trim actuator is then controlled to rotate the trimmable device based on the trim rate so as to adjust a trim position of the trimmable device.

21 Claims, 5 Drawing Sheets

(56) References Cited

U.S. PATENT DOCUMENTS

| | | | | |
|---|---|---|---|---|
| 9,694,892 | B1 | 7/2017 | Anschuetz et al. | |
| 9,751,605 | B1 | 9/2017 | Anschuetz et al. | |
| 9,919,781 | B1 | 3/2018 | Andrasko et al. | |
| 10,000,267 | B1 | 6/2018 | Anschuetz | |
| 10,059,415 | B1 | 8/2018 | Anschuetz | |
| 10,829,190 | B1 * | 11/2020 | Pugh | B63H 20/10 |
| 2007/0202757 | A1 | 8/2007 | Moore | |
| 2011/0143608 | A1 | 6/2011 | Chiecchi | |
| 2011/0217888 | A1 | 9/2011 | Kuriyagawa et al. | |
| 2016/0375972 | A1 | 12/2016 | Andrasko et al. | |
| 2016/0375973 | A1 * | 12/2016 | Andrasko | B63H 20/10 440/1 |
| 2018/0050780 | A1 | 2/2018 | Anschuetz | |
| 2018/0050781 | A1 | 2/2018 | Anschuetz | |

* cited by examiner

METHODS AND SYSTEMS FOR CONTROLLING TRIM RATE OF TRIMMABLE MARINE DEVICES WITH RESPECT TO A MARINE VESSEL

CROSS REFERENCE TO RELATED APPLICATION

This application is a continuation of U.S. patent application Ser. No. 17/585,273, filed Jan. 26, 2022, which is a continuation of U.S. patent application Ser. No. 16/731,803, filed Dec. 31, 2019, all of which applications are incorporated herein by reference in their entirety.

FIELD

The present disclosure relates to methods and systems for controlling trim position of a trimmable device coupled to a transom of a marine vessel, and more particularly to methods and systems providing variable speed trim actuation for variably controlling a trim rate based on various conditions.

BACKGROUND

The following U.S. patents and/or patent applications are incorporated herein by reference, in entirety:

U.S. Pat. No. 4,318,699 discloses a sensor that responds to the operation of a marine transportation system to sense on-plane and off-plane conditions of a boat to operate a trim control to automatically position a trimmable drive for a desired boating operation. The preferred embodiment senses engine speed while an alternative embodiment senses fluid pressure opposing boat movement. The drive is moved to an auto-out position at high speeds and to a trimmed-in position at lower speeds.

U.S. Pat. No. 4,490,120 discloses a hydraulic system for trimming and tilting an outboard propulsion unit, which includes both trim piston-cylinder units and a trim-tilt piston-cylinder unit. The flow of hydraulic fluid from the reversible pump is controlled by a spool valve. A pressure relief valve is mounted in the spool to maintain pressure on one side of the spool when the pump is turned off to rapidly close the return valve and prevent further movement of the piston-cylinder units.

U.S. Pat. No. 4,776,818 discloses an electrical control system for trimming a pair of stern motors or drives mounted side-by-side on a boat. The two drives are both jointly and independently movable through a plurality of trim positions. The system includes two trim cylinders, each coupled to one associated drive, to move its associated drive to different trim positions both jointly as well as independently of each other. An operator controlled mechanism energizes and de-energizes the two trim cylinders simultaneously to jointly vary the trim position of the two drives. Two lines, each coupled at its first end to one associated drive, independently detect both the angular trim position of its associated drive with respect to the other drive as well as detect the trim position of the two drives jointly. Automatic control means coupled to the second end of each of the two lines is responsive to the two lines, when the two drives are not in the desired equal trim position with respect to each other, and controls switches to inactivate one of the trim cylinders and thereby move the other of the trim cylinders with respect to the inactivated one trim cylinder until the desired equal trim position is achieved between the two drives.

U.S. Pat. No. 4,861,292 discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 6,007,391 discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 7,347,753 discloses a hydraulic system for a sterndrive marine propulsion device that directs the flow of hydraulic fluid through the body and peripheral components of a gimbal ring in order to reduce the number and length of flexible hydraulic conduits necessary to conduct pressurized hydraulic fluid from a pump to one or more hydraulic cylinders used to control the trim or tilt of a marine drive unit relative to a gimbal housing.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 9,919,781, is assigned to the Applicant of the present application, discloses systems and methods for controlling position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband. The method may include sending a second control signal for a defined brake time to trim the drive unit in an opposite, second direction in response to a determination that the actual trim position has one of achieved and exceeded the target trim position.

U.S. Pat. No. 9,751,605, is assigned to the Applicant of the present application, discloses a method for controlling a trim system on a marine vessel includes receiving an actual trim position of a trimmable marine device at a controller and determining a trim position error by comparing the actual trim position to a target trim position with the controller. The method also includes determining an acceleration rate of the marine vessel. In response to determining that the trim position error exceeds a first error threshold and the magnitude of the acceleration rate exceeds a given rate threshold, the controller commands the marine device to the target trim position. In response to determining that the trim position error exceeds the first error threshold and the acceleration rate does not exceed the given rate threshold, the controller commands the marine device to a setpoint trim position that is different from the target trim position. An associated system is also disclosed.

U.S. Pat. No. 9,694,892 discloses a method for controlling a trim system on a marine vessel includes receiving an actual trim position of a trimmable marine device at a controller and determining a magnitude of a trim position error by comparing the actual trim position to a target trim position with the controller. The method also includes determining a magnitude of an acceleration rate of the marine vessel. The controller determines the activation time of a trim actuator coupled to and rotating the marine device with respect to the marine vessel based on the magnitude of the trim position error and the magnitude of the acceleration rate. The controller then sends a control signal to activate the trim actuator to rotate the marine device toward the target trim position. The method includes discontinuing the control signal once the activation time expires to deactivate the trim actuator. A corresponding system is also disclosed.

U.S. Pat. No. 10,000,267 discloses a method for a trimmable marine device includes determining a target trim position of the marine device. A trim actuator is activated for an activation time that is calibrated to move the marine device from a current trim position to the target trim position. After activating the trim actuator for the calibrated activation time, a difference between an actual trim actuator condition and a desired trim actuator condition is calculated. An activation-time adapt value is determined based on the difference. The calibrated activation time is adjusted using the adapt value, and the trim actuator is activated for the adjusted activation time in response to subsequent changes in the target trim position. The adapt value is configured such that activating the trim actuator for the adjusted activation time moves the marine device closer to the target trim position than does activating the trim actuator for the calibrated activation time.

U.S. Pat. No. 10,059,415 discloses a system for controlling a tilt-trim position of a propulsion device on a marine vessel includes a user input device generating a command to rotate the propulsion device to a desired tilt-trim position, a position sensor sensing a current tilt-trim position of the propulsion device, a control module receiving the user command and the current tilt-trim position, and a tilt-trim actuator rotating the propulsion device. In response to determining that the propulsion device's engine is not running, the control module rotates the propulsion device until the desired tilt-trim position is achieved, and starts the engine in response to determining that the current tilt-trim position does not exceed a threshold. In response to determining that the engine is running, the control module determines whether a vessel and/or engine speed condition is met, and if so, rotates the propulsion device about the tilt-trim axis until the desired tilt-trim position is achieved.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling tilt-trim positon of a trimmable device on a marine vessel includes receiving an engine speed, a vessel speed, a vessel pitch, and/or a vessel acceleration. A trim rate is then determined based on the engine speed, the vessel speed, the vessel pitch, and/or the vessel acceleration. The trim rate specifies a rate of rotation of the trimmable device about a horizontal tilt-trim axis, and the trim rate is determined such that the rate of rotation is minimized at high vessel speeds and high engine speeds and the rate of rotation is maximized at low vessel speeds and low engine speeds. A variable speed trim actuator is then controlled to rotate the trimmable device based on the trim rate so as to adjust a trim position of the trimmable device.

In another embodiment, a method of controlling tilt-trim position of a trimmable device on a marine vessel includes receiving an engine speed and/or an engine operation state for a marine drive on the marine vessel, as well as a vessel speed of the marine vessel. A trim rate is then determined based on at least one of the engine speed, the vessel speed, and the engine operation state, where the trim rate specifies a rate if rotation of the trimmable device about a horizontal tilt-trim access. A trim rate multiplier is determined based on a measured trim position of the trimmable device. The trim rate multiplier is a value between zero and one and is calibrated such that the trim rate multiplier decreases as the trimmable device approaches a maximum position or a minimum position within the trim and/or tilt range for a particular trimmable device. A reduced trim rate is then determined based on the trim rate multiplier, and a variable speed trim actuator is controlled to rotate the trimmable device based on the reduced trim rate as the trimmable device approaches the maximum or minimum positions.

One embodiment of a variable speed trim system on a marine vessel includes a trimmable device and a variable speed trim actuator configured to rotate the trimmable device about a horizontal tilt-trim access so as to adjust a trim position of the trimmable device. A controller is configured to determine a trim rate based on at least one of an engine speed of an engine on the marine vessel and a vessel speed of the marine vessel. The trim rate specifies a rate of rotation of the trimmable device about the horizontal tilt-trim axis. The trim rate is determined such that the rate of rotation is minimized at high vessel speeds and high engine speeds and the rate of rotation is maximized at low vessel speeds and low engine speeds. The variable speed trim actuator is then controlled to rotate the trimmable device based on the trim rate so as to adjust a trim position of the trimmable device.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
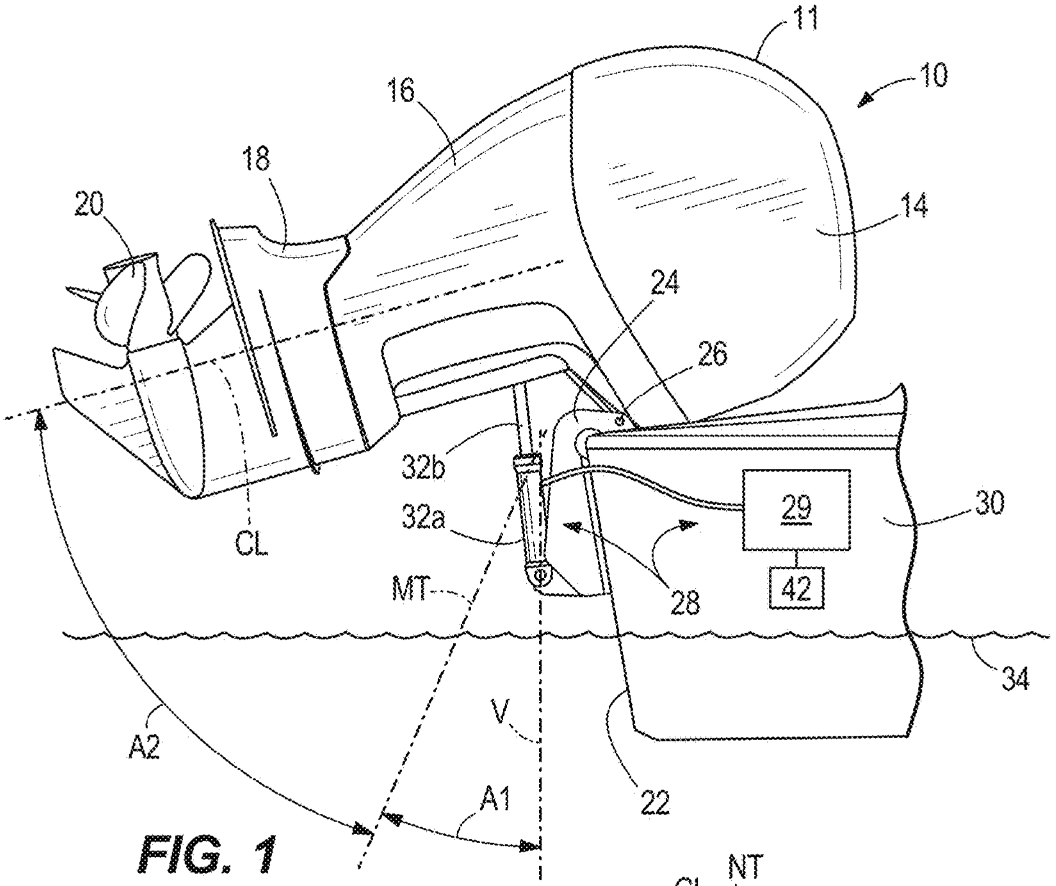
FIG. 1 illustrates one example of a variable speed trim system for controlling tilt-trim position of a trimmable device.

The present disclosure relates to systems and methods for controlling tilt and trim positions of one or more trimmable devices on a marine vessel. Examples of such trimmable devices include, but are not limited to, marine propulsion devices such as outboard motors or lower units of stern drives, trim tabs, and/or trim deflectors. In certain examples described herein, the trimmable device is illustrated as a marine propulsion device, and more particularly an outboard motor, rotatable about a horizontal tilt-trim access such that the propulsion device is moved up and down with respect to a marine vessel to which it is coupled.

Through their extensive experimentation and research in the relevant field, the inventors have recognized that an improved trim system is needed for controlling tilt and trim of a trimmable device on a marine vessel that provides a variable rate of change of trim position, or trim rate, depending on the conditions of the marine vessel and/or the trim system. For example, improved operation conditions for a marine vessel are provided by the disclosed trim system that enables rapid trim movement at slower vessel speeds and engine speeds and slower, more refined, trim movement when the vessel is traveling at higher speeds and the engine is operating at higher engine speeds. Vessels operating at high speed, such as while operating on plane, are sensitive to changes in trim. Aggressive or drastic changes in trim have the potential to cause dangerous situations when the marine vessel is traveling at high speed, such as causing bow hook.

Conversely, slow trim movement at low vessel speeds can lead to a negative user experience, where the trim system is not sufficiently responsive and impacts vessel performance and/or causes the operator to have to wait while the trim system slowly moves to the desired position. For example, in a rapid acceleration event, sometimes referred to as a "holeshot" vessel operators often start the propulsion at a fully trimmed-in position, or "full tuck," and then trim-out the propulsion device once the operator reaches wide open throttle and/or as the vessel gets on plane. The inventors have recognized that presently trim systems are insufficiently responsive for optimally handling trim changes during these acceleration events because the trim rate of change is too slow. To provide another example of burdensomely slow trim rates, the inventors have recognized that boat operators often desire fast trim rates when trimmable devices are being moved into a tilt range (described in more detail below), which includes angels of the trimmable device required for towing the marine vessel, transporting the marine vessel by land, or other scenarios. These scenarios typically occur where the propulsion device(s) on the marine vessel are off or idling, and the operator desires to quickly trim the trimmable devices to a maximum trim-tilt position, such as to rotate the outboard motor out of the water for trailering or when it is otherwise not in use.

Accordingly, the inventors developed the disclosed system and method providing variable trim rate based on various vessel and engine parameters, including vessel speed, engine speed, measured trim position, and/or operation states of one or more propulsion devices, such as whether or not the engines or motors powering propulsion are running. A person of ordinary skill in the art will understand in view of the present disclosure that, as an alternative to an engine, the propulsion device(s) may comprise an electric motor that causes rotation of the propeller 20. In some embodiments, the trim rate is also controlled based on vessel pitch, vessel acceleration, and/or operating conditions of the propulsion system such as throttle demand inputs. Additionally, in some embodiments the trim rate is controlled based on a position of the trimmable device within its range of allowable trim movement between a minimum position and a maximum position so as to reduce the trim rate as the trimmable device approaches the maximum or minimum trim and/or tilt position limits.

The trim actuator of the present system is a variable speed actuator configured to move the trimmable device at two or more different rotational speeds, or trim rates, about a horizontal axis of rotation (the tilt-trim axis). In one embodiment, the variable speed trim actuator is a brushless DC motor capable of rotating the trimmable device at continuously increasing or decreasing speeds. In another example, the trim actuator may be a hydraulic system having a hydraulic pump, an electric over hydraulic system, an electric linear actuator, a pneumatic actuator, or other types of devices configured to provide at least two or more different trim speeds, or trim rates, and in some embodiments multiple different trim speeds.

Those skilled in the art of marine vessel propulsion and control are familiar with many different ways in which the tilt-trim position of a propulsion device can be controlled to change the handling or feel of the vessel. For example, many manual trim control systems are known to those skilled in the art. The operator inputs a command to change the trim position of the propulsion device, for example by using a keypad, button, or similar input device with "trim up" and "trim down" input choices. The operator can select these input choices to trim the propulsion device up or down until a desired handling or feel of the vessel over the water is achieved. The operator can use the same or a different input device to rotate the propulsion device up beyond the trim range and into the tilt range, such as if the operator wishes to instead use a trolling motor or kicker or is trailering the vessel. Alternatively or additionally, trim position may be controlled automatically. Auto-trim systems that automatically determine trim position and control the trim actuator, for example, based on vessel speed or vessel position/orientation are known, such as the embodiments described in U.S. Pat. Nos. 4,318,699 and 10,000,267, as well as other patents and patent applications incorporated herein by reference.

FIG. 1 illustrates one example of a trimmable device 10, which in this example is a marine propulsion device 11, and more particularly, outboard motor. In other examples, the trimmable device 10 could be a trimmable propulsion device 11 such as a sterndrive, pod drive, jet drive, or the like, or may be a dedicated trim device such as a trim tab. The propulsion device 11 includes a powerhead section 14 connected via a midsection 16 to a lower unit 18, including a propeller 20 that provides propulsive force as it rotates through water 34. A person of ordinary skill in the art will understand in view of the present disclosure that the powerhead section 14 comprises a powerhead, such as an engine or electric motor. In other examples, the propulsion device 11 includes an impeller or a jet pump for providing propulsive force. The propulsion device 11 is coupled to a transom 22 of a marine vessel 30 by way of a mounting bracket 24. The propulsion device 11 is rotatable up and down with respect to the marine vessel 30 about a horizontal trim-tilt axis 26 by way of extension and retraction of a trim actuator 28. As mentioned above, the trim actuator 28 can be a hydraulic, pneumatic, or electric device. Here, the trim actuator 28 is a hydraulic device including a trim cylinder 32*a* and trim rod 32*b* and a pump/motor 29 that provides and removes hydraulic fluid to/from the trim cylinder 32*a* to extend and retract the trim rod 32*b* and raise and lower the propulsion device 11 connected thereto. Note that the pump/motor 29 could be provided other than where schematically shown. In other embodiments, the trim actuator 28 may be a brushless DC motor, such as a brushless DC motor-driven piston pump configured to rotate the trimmable device 10 about the horizontal trim-tilt axis 26.

Figure 2:
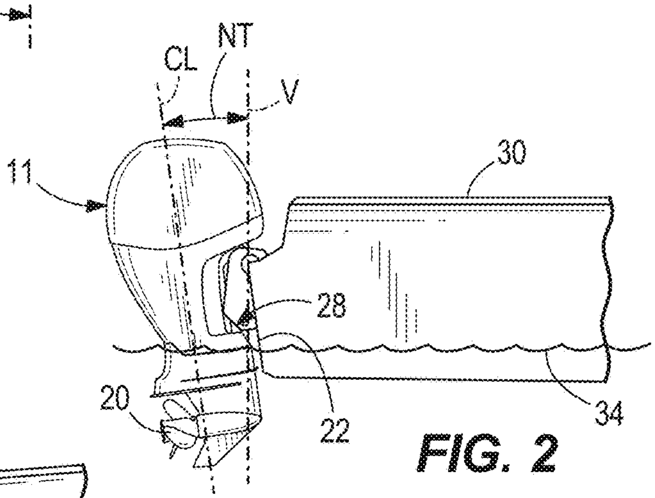
FIG. 2 illustrates a trimmable device at a minimum trim position.
Figure 3:
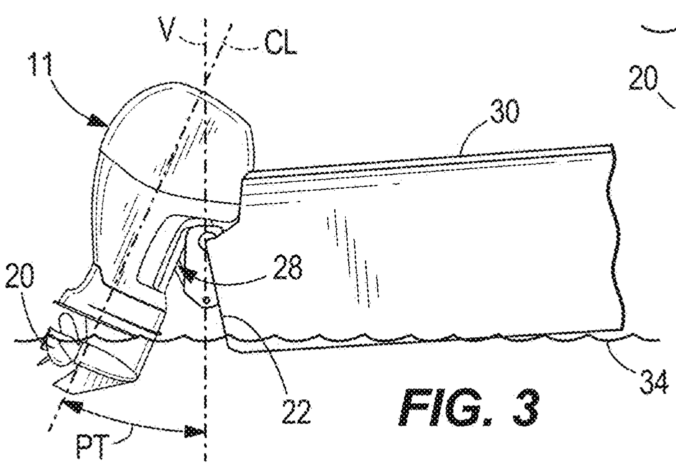
FIG. 3 illustrates a trimmable device at a maximum trim position.

FIGS. 2-3 illustrate how the attitude of the marine vessel 30 can be controlled by way of controlling a trim position of the trimmable device 10 with respect to the transom 22 of the marine vessel 30. As shown, the trimmable device 10 can be trimmed to different angles with respect to the transom 22 via the trim actuator 28 as known to those having ordinary skill in the art. In FIG. 2, the propulsion device 11 is shown in a trimmed in (trimmed down) position. This can be seen by comparing centerline CL of the propulsion device 11 with vertical line V, where the lines CL and V will intersect below where the propulsion device 11 is connected to the transom 22 at negative trim angle NT. Here, the propulsion device 11 is shown in a minimum trim position, in which the trim rod 32*b* is fully retracted into the trim cylinder 32*a* and the propulsion device 11 is therefore at 0% of its potential full angular movement. In FIG. 3, the propulsion device 11 is shown in a trimmed out position in which the lines CL and V intersect above the propulsion device's connection point to the transom 22 at positive trim angle PT. Here, the propulsion device 11 is shown in a maximum trim position, in which the propulsion device 11 is at a predetermined percentage of its potential full angular movement that will maintain the propeller 20 in the water at a functional position. Generally, the maximum trim position is between about 25% to about 35% of potential full angular movement, but varies based on the size and type of the propulsion device 11, the trim actuator 28, and the marine vessel 30, and the height of the propulsion device 11 on the transom 22. Above this predetermined maximum trim position, the propeller 20 is not covered by enough water that it can produce thrust to move the vessel and the propulsion device 11 is very loud.

The trim position in FIG. 2 is generally used when the marine vessel 30 is operating at slower speeds. For example, the trim position in FIG. 2 is often used during launch of the marine vessel 30, before the marine vessel has gotten up to speed and on plane. In contrast, the trim position shown in FIG. 3 is often used when the marine vessel 30 is on-plane and high speeds are required. At high speeds, the trim position shown in FIG. 3 causes the bow of the marine vessel 30 to rise out of the water 34 as suggested by the higher height of the marine vessel 30 in the water 34 in comparison to the position shown in FIG. 2.

Prior art trim systems generally only provide one trim rate, or speed of rotation of the trim device, and thus trim changes are controlled to variously turn on and off the trim system at appropriate times so as to reach the desired trim position of the trimmable device 10. This single trim rate is chosen as a tradeoff between precise and safe trim control and responsiveness of the trim system, and thus is generally not ideal for situations where very precise and small changes in trim are required, or for situations where large and fast changes in trim are required. In prior art systems, the time it takes for the propulsion device 11 to be trimmed up from the position of FIG. 2 to that of FIG. 3 is relatively long, such as on the order of a minute or more, but varies depending on the type and configuration of the trim actuator 28, the starting trim position, and how and where the trim actuator 28 is coupled to the propulsion device 11.

Thus, for large trim changes, the trim system is relatively unresponsive, which can be frustrating to an operator. This problem is compounded when an operator wishes to rotate the propulsion device into the tilt range, and thus to rotate the propulsion device even further. To provide one example, the trim system for an outboard propulsion device 11 may rotate the propulsion device from a minimum trim position of −4° to a maximum trim position of 20° from the vertical axis V, and the maximum tilt positon may be, for example, 60° from the vertical axis V.

Referring back to FIG. 1, the propulsion device 11 may be rotatable to an angle A1, where it is at an angle from vertical V that provides a functional depth of the propeller 20 in the water 34 for propelling the marine vessel 30. In other words, the position of the propulsion device 11 were its centerline CL to be aligned with the line MT would be the same as that shown in FIG. 3, i.e. A1=PT. The propulsion device 11 may alternatively be trimmed to an angle A1+A2, where its centerline CL is at an angle from vertical V that raises the propeller 20 out of the water 34 altogether. Such a position is in the propulsion device's tilt range, which includes angles of the propulsion device 11 from vertical V that may be required for towing the marine vessel 30, for transporting the marine vessel 30 by land, or for utilizing a trolling motor to propel the marine vessel 30 instead. The line MT thus represents a demarcation between a trim range and a tilt range of the propulsion device 11. The maximum trim position may be achieved when the centerline of the propulsion device 11 is aligned along this line MT. Note that the full angle A1+A2 shown here is the maximum tilt position of the propulsion device 11, in which the trim rod 32*b* is fully extended from the trim cylinder 32*a*. This represents 100% of the potential full angular movement of the propulsion device 11.

Note that in some examples, the trim actuator 28 could in fact comprise separate assemblies for rotating the propulsion device 11 through each of the tilt and trim regions. In other words, a first actuator (or pair of actuators) could rotate the propulsion device 11 through the angle A1 to the maximum trim position shown in FIG. 3, while a second actuator (or pair of actuators) could rotate the propulsion device 11 through the angle A2 to the maximum tilt position shown in FIG. 1. The separate trim actuators could be controlled by the same controller 42 or separate controllers.

Figure 4:
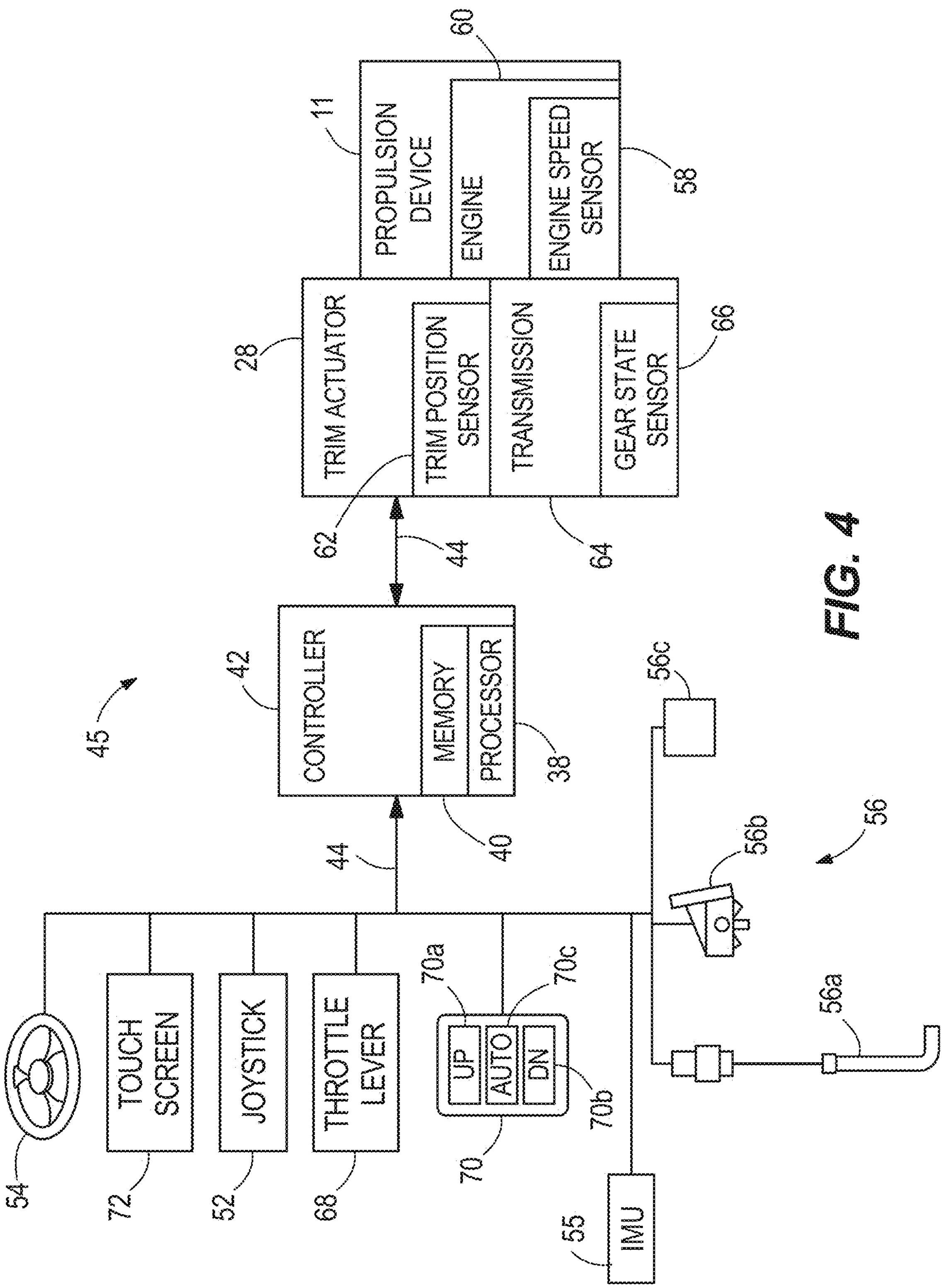
FIG. 4 is a schematic of an exemplary variable speed trim system according to one embodiment of the present disclosure.

FIG. 4 shows an example of a propulsion system 36 associated the marine vessel 30 of FIGS. 1-3, which carries out the methods described further herein below. In one example, software, which when executed by a processor 38 carries out the methods of the present disclosure, can be loaded in a memory 40 of a controller 42, such as an engine controller, a trim controller, a propulsion controller, a helm controller, etc. However, it should be understood that a separate controller could be provided for carrying out the methods described herein or that the methods described herein could be carried out by any combination of the above-described controller or other types of controllers.

The controller 42 communicates with one or more components of the propulsion system via input/output interfaces and a communication link 44, which can be a wired or wireless link. The controller 42 is capable of monitoring and controlling one or more operational characteristics of the propulsion system and its various subsystems by sending and receiving control signals via the communication link 44. In one example, the communication link 44 is a controller area network (CAN) bus, but other types of links could be used. It should be noted that the extent of connections of the communication link 44 shown herein is for schematic purposes only, and the communication link 44 in fact provides communication between the controller 42 and each of the peripheral devices noted herein, although not every connection is shown in the drawing for purposes of clarity.

The controller 42 receives inputs from several different sensors and/or input devices aboard the marine vessel 30. For example, the controller 42 receives a steering input from a steering wheel 54 and/or joystick 52. The controller 42 is also provided with an input from a vessel speed sensor 56. The vessel speed sensor 56 may be, for example, a pitot tube sensor 56*a*, paddle wheel type sensor 56*b*, or any other speed sensor appropriate for sensing the actual speed of the marine vessel 30 in miles per hour (mph) or kilometers per hour (kph). The vessel speed may instead be obtained by taking readings from a GPS device 56*c*, which calculates speed by determining how far the marine vessel 30 has traveled in a given amount of time. A vessel motion sensor 55 may also be provided for sensing vessel movement and position, including a pitch, roll, and yaw of the marine vessel. For example, the vessel motion sensor may be an inertial measurement unit (IMU) configured for measuring vessel acceleration and/or orientation of the marine vessel, including the pitch, roll, and yaw of the marine vessel, as it changes over the course of an acceleration event, or launch, where the pitch of the marine vessel rapidly increases at the start of launch and then slowly decreases as the marine vessel gets on plane. In some embodiments, the vessel motion sensor 55 and the GPS device 56*c* may be provided in a combined unit, as is known.

The propulsion device 11 is provided with an engine or motor rotational speed sensor 58, such as but not limited to a tachometer, which determines a speed of the engine 60 or motor powering the trimmable marine device 10, i.e., the powerhead, in rotations per minute (RPM). The engine or motor speed can be used along with other measured or known values to approximate a vessel speed (i.e., to calculate a pseudo vessel speed). A trim position sensor 62 is also provided for sensing an actual position of the trim actuator 28, for example, by measuring a relative position between two parts associated with the trim actuator 28. The trim position sensor 62 may be any type of sensor known to those having ordinary skill in the art, for example a Hall Effect sensor or a potentiometer. A transmission 64 and gear state sensor 66 can also be provided for the propulsion device 11. FIG. 3 shows an instance in which the propulsion device 11 is an outboard motor, but in the instance that the propulsion device 11 is, for example, a stern drive or a trim tab, the transmission, engine, and their associated components would not be coupled to the trim actuator 28 as shown herein.

Other inputs to the system 45 can come from operator input devices such as a throttle lever 68, a keypad 70, and a touchscreen 72. The throttle lever 68 allows the operator of the marine vessel to choose to operate the vessel in neutral, forward, or reverse, as is known, and also generates a throttle demand input to control throttle position and/or engine speed. The keypad 70 can be used to initiate or exit any number of control or operation modes (such as auto-trim mode), or to make selections while operating within one of the selected modes. In one example, the keypad 70 comprises an interface having a “trim up” button 70*a*, a “trim down” button 70*b*, and an “auto-trim on/resume” button 70*c*. The touchscreen 72 can also be used to initiate or exit any number of control or operation modes (such as trim up, trim down, or auto-trim mode), and in that case the inputs can be buttons in the traditional sense or selectable screen icons. The touchscreen 72 can also display information about the system 45 to the operator of the vessel, such as engine speed, vessel speed, trim angle, trim operating mode, vessel acceleration rate, etc.

Using these various inputs, the controller 42 operates as described herein in order to provide a variable speed trim system 45 that provides fast or slow trim rates that are situationally appropriate. In various embodiments, the variable rate trim system 45 and control method described herein may be employed as part of auto-trim systems that automatically determine trim position and control the trim actuator 28 accordingly. Alternatively or additionally, the variable trim control system 45 and control methods described herein may be utilized to provide variable trim rates in response to user inputs to control trim. For example, the keypad 70 is an exemplary user input device configured to receive a user input instructing a direction of adjustment of the trim position in one of a trim increase direction or a trim decrease direction. In such an embodiment, the user input controls the direction of adjustment, i.e., whether the trim is increased or decreased, and the rate at which the trim is increased or decrease is calculated by the controller 42 as described herein. For example, the trim rate may be determined based on vessel pitch, engine speed, vessel speed, and/or measured trim position (e.g., as sensed by trim position sensor 62).

Figure 5:
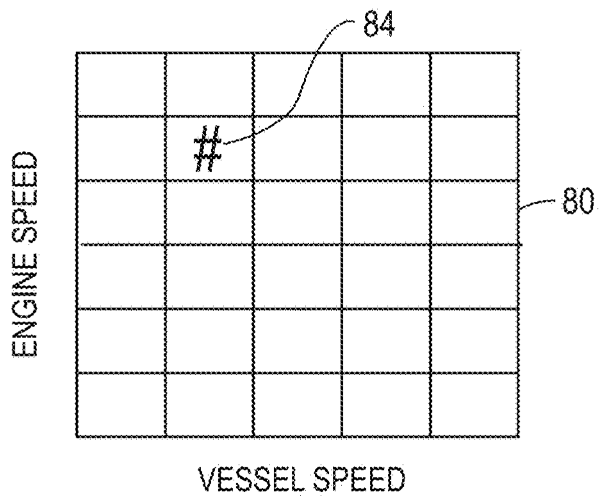
FIG. 5 schematically depicts a table providing trim rate a function of engine speed and vessel speed.

In various embodiments, the controller 42 is configured to determine an optimal trim rate based at least on engine speed and vessel speed. For example, a current engine speed based on measurements from the engine speed sensor 58 and a current vessel speed based on measurements from one or more of the vessel speed sensors 56 may be utilized as inputs for determining a trim rate. As shown in FIG. 5, a table 80 providing trim rate as a function of engine speed and vessel speed may be stored in memory 40 or otherwise accessible to the controller 42. The table 80 provides trim rate values 84 indexed based on vessel speed and engine speed such that trim rate is minimized at high vessel speeds and high engine speeds and trim rate is maximized at low vessel speeds and low engine speeds. In other embodiments, a one dimensional table may be provided indexing trim rate based only on vessel speed or based only on engine speed, and one or both of which may be utilized in different control scenarios.

Figure 6:
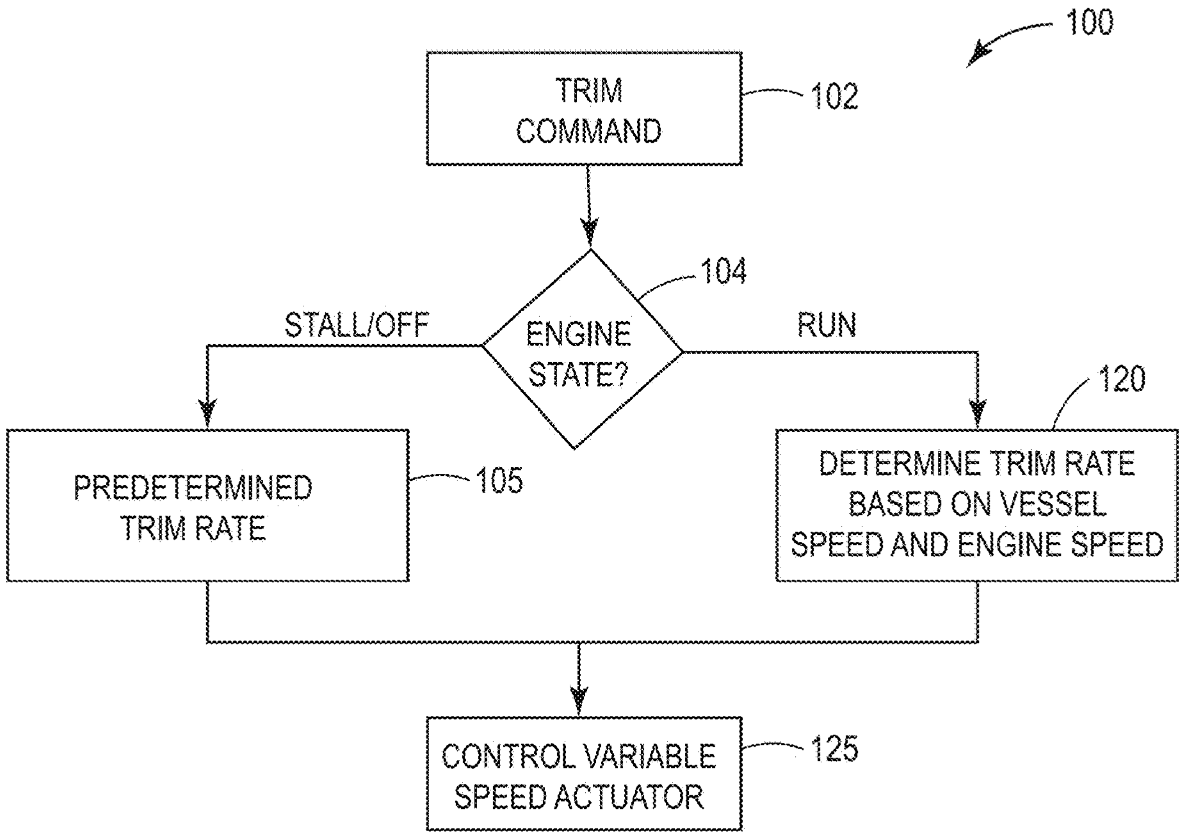
FIGS. 6-8 illustrate embodiments of methods of controlling tilt-trim position of a trimmable device on a marine vessel according to the present disclosure.

FIG. 6 depicts an exemplarily embodiment of a method 100 of controlling tilt-trim position of a trimmable device 10, such as a propulsion device 11. A trim command is received at step 102. The trim command may be a user input instructing a trim adjustment in one of a trim increase direction or a trim decrease direction. Alternatively, the trim command may be a trim adjustment instruction generated by an auto-trim system, such as based on vessel speed, vessel position or propulsion conditions. An engine operation state is determined at step 104. If the engine is stalled, or off, then the trim rate is set equal to a pre-determined trim rate value, such as a maximum trim rate. When the engine is off, trim rate adjustments are typically significant changes in trim position, such as to move the trimmable device 10 into the maximum tilt position for transporting the vessel 30. If the engine is running at step 104, then the trim rate is determined at step 120 based on the vessel speed and the engine speed. For example, the trim rate may be determined utilizing the table 80 providing trim rate values 84 based on engine speed and vessel speed. In various embodiments, the rate may further be determined based on additional variables, such as provided in the examples below. The variable speed actuator is then controlled at step 125 based on the determined trim rate.

Figure 7:
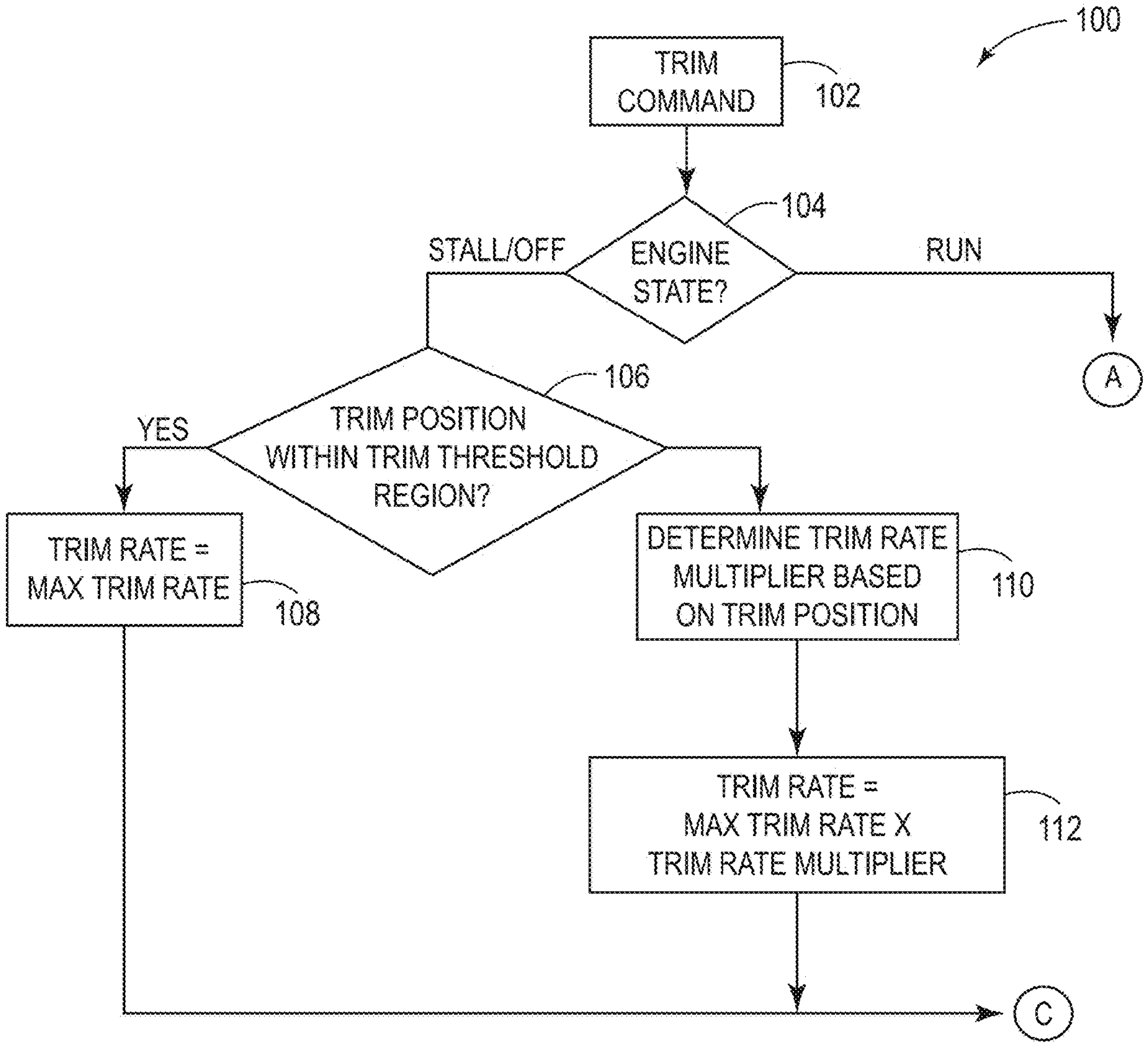
Figure 8:
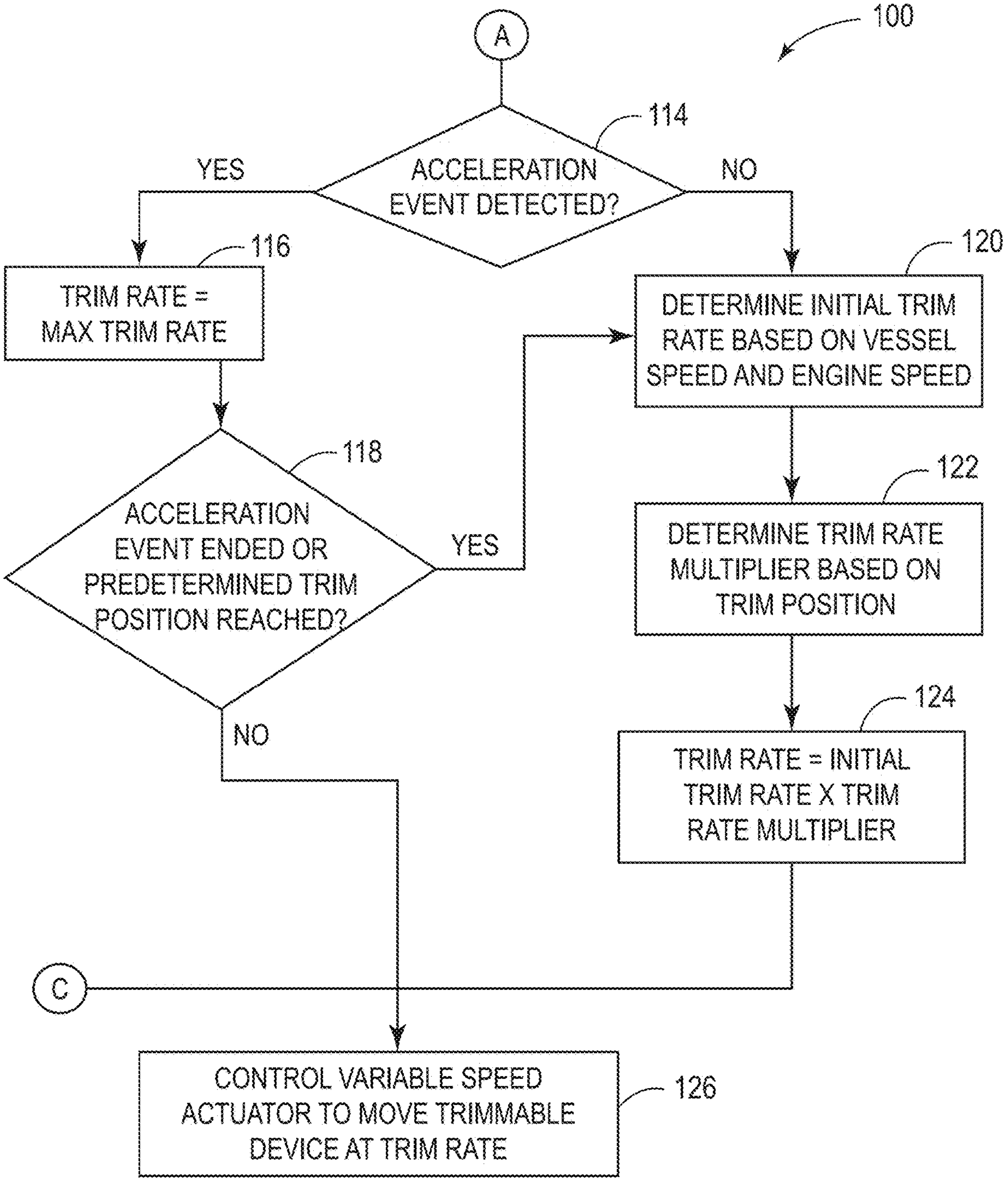

FIGS. 7 and 8 depict additional embodiments and exemplary steps of methods of controlling tilt-trim position of a trimmable device. A trim command is received at step 102 which, as described above, may be generated based on the user input or based on a command from an auto-trim-system. If the engine operation state at step 104 is off, then a fast trim rate is determined. In certain embodiments. The trim rate may be determined based on trim position such that the trim rate slows as the trimmable device approaches a maximum or minimum position, which may be a trim or tilt position depending on the situation. Thereby, overshoot is avoided, which can be a problem when moving the trimmable device at high trim rates. For example, where the trimmable device is an outboard propulsion device, trim overshoot beyond a maximum tilt position or minimum trim position could cause the propulsion device 11 to hit the transom 22 of marine vessel. Thus, it may be desirable to ramp down the trim rate as the trimmable device 10 reaches the maximum or minimum end points of the trim range and/or tilt range.

In certain embodiments, a trim multiplier may be utilized to decrease the trim rate as the trimmable device approaches the maximum or minimum trim positions. The trim rate multiplier is a value between zero and one such that as the trim rate multiplier decreases, it further reduces the trim rate. In certain embodiments, the trim rate multiplier may be based on the measured trim position, such as by a look up table based on measured trim position. In other embodiments, the trim rate multiplier may be a fixed value.

In the example at FIG. 7, instructions are executed at step 106 to determine whether a trim position is within a predetermined trim threshold range, or region, of a maximum or minimum trim position. The trim threshold region may be a threshold distance from the maximum or minimum trim position. To provide one example, the predetermined trim threshold may be any trim position within 5 degrees of the maximum or minimum trim position, or the maximum tilt position. In other examples, the predetermined trim threshold may be a greater or lesser distance from the maximum or minimum trim position. If the trim position is not within the trim threshold region near the maximum or minimum ends of trim range, then the maximum trim rate is assigned at step 108. If the measured trim position is within the trim threshold region at one of the outer trim ranges, then a trim rate multiplier is determined at step 110. Alternatively, the trim position threshold determination may be eliminated and the trim rate multiplier may be calibrated for the full range of trim positions, wherein the trim rate multiplier is equal to one at trim positions that are not within the described threshold region and thus does not decrease the trim rate.

The trim rate multiplier may be based on trim position such that as the trim position grows closure to the maximum or minimum trim position then the trim rate multiplier decreases toward zero. In one embodiment, the trim rate multiplier is calibrated such that the trim rate multiplier is zero once the measured trim position reaches the maximum or minimum trim position, or the maximum tilt position as the case may be, such that the trim rate will also be zero and overshoot will be avoided. The trim rate is then calculated at step 112 as the maximum trim rate multiplied by the trim rate multiplier. The variable speed trim actuator 28 is then controlled at step 126 (FIG. 8) to move the trimmable device at the calculated trim rate.

FIG. 8 depicts exemplary steps to determine trim rate when the engine within the trimmable propulsion device 11 or otherwise associated with the trimmable device 10 is running, as indicated by the engine operation state at step 104. Instructions are executed at step 114 to determine whether an acceleration event is detected. A vessel acceleration event is a rapid acceleration of the marine vessel, which may be detected based on a measured vessel pitch or vessel acceleration, such as based on IMU 55 measurements, and/or based on output of the throttle lever 68. For example, a vessel acceleration event may be detected when a vessel pitch measured by the IMU 55 exceeds a threshold vessel pitch and/or when the vessel acceleration measured by the IMU exceeds a threshold vessel acceleration. Alternatively or additionally, the acceleration event may be detected, or triggered, when the throttle demand input at the throttle lever 68 exceeds a threshold throttle demand, which may be a threshold rate of change of the throttle lever 68. Thus, if the throttle lever 68 is quickly moved from idle to wide open throttle, for example, an acceleration event is detected at step 114 and the trim rate is then controlled to quickly move the marine vessel to a desired trim position or running on plane.

Oftentimes, experienced boat drivers launch a marine vessel starting with the trimmable propulsion device 11 fully trimmed into a minimum trim position. Quickly after launch the vessel operator desires to move the trimmable propulsion device 11 out, such as to a level trim position or other trim position near the vertical axis V. Thus, in the depicted method the trim rate change may be maximized or quickly provided after detection of the acceleration event to move the fully-trimmed-in propulsion device 11 outward from the minimum trim position toward a predetermined trim position, such as level trim where the center line CL of the propulsion device 11 is approximately parallel with the keel of the vessel 30. In the depicted example, when an acceleration event is detected at step 114 the trim rate is assigned to a maximum trim rate at step 116. Instructions are executed at step 118 to determine whether the acceleration event has ended or whether a predetermined trim position has been reached. The predetermined trim position may be a user-calibratable value, or may be a set trim position, such as level trim. In certain examples, it may be determined that the acceleration event has ended when the vessel pitch is less than the threshold vessel pitch and/or the measured vessel acceleration is less than the threshold vessel acceleration. In other embodiments, the threshold event end may be determined based on a preset timer which is initiated upon detection of the acceleration event.

If no acceleration event is detected, or the acceleration event has ended, then the trim rate is determined based on vessel speed and engine speed, and may further be determined based on trim position. In the depicted example, an initial trim rate determination is made based on vessel speed and engine speed, such as utilizing the table 80 exemplified at FIG. 5. A trim rate multiplier is then determined at step 122 based on trim position. As described above, the trim rate multiplier is calibrated to slow the trim rate as the trimmable device approaches its maximum or minimum trim position. Thus, for trim positions that are not near the end regions of the trim range, the trim rate multiplier will be one and will not change the trim rate determined based on vessel speed and engine speed. For trim positions that are near the ends of the trim range (or the tilt range when tilt control is effectuated), then the trim rate multiplier will be less than one and will decrease as the trim position reaches the maximum or minimum position. In other embodiments, the threshold assessment depicted in FIG. 7 may be conducted where the trim rate multiplier is only applied when the trim position is within the end regions of the trim range. The trim rate is then calculated at step 124 as the initial trim rate multiplied by the trim rate multiplier. The variable speed trim actuator 28 is then controlled at step 126 to move the trimmable device 10 at the determined trim rate.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling trim position of a trimmable device on a marine vessel, the method comprising:

measuring a rotational speed of a propulsion device on the marine vessel and/or a vessel speed of the marine vessel;

determining, at a controller, a trim rate based on the rotational speed and/or the vessel speed and a measured trim position of the trimmable device, wherein trim rate specifies a rate of rotation of the trimmable device about a horizontal axis;

wherein the trim rate is determined such that the rate of rotation is less at high vessel speeds and/or high rotational speeds than the rate of rotation at low vessel speeds and/or low rotational speeds; and controlling a variable speed trim actuator to rotate the trimmable device based on the trim rate so as to adjust a trim position of the trimmable device.

2. The method of claim 1, further comprising decreasing the trim rate as the rotational speed and/or the vessel speed increases towards a maximum rotational speed and/or maximum vessel speed.

3. The method of claim 1, wherein the rate of rotation is minimized at high vessel speeds and high engine speeds and the rate of rotation is maximized at low vessel speeds and low engine speeds.

4. The method of claim 1, wherein the rotational speed of the propulsion device is a speed of a powerhead of the propulsion device in rotations per minute (RPM).

5. The method of claim 1, further comprising:

receiving a user input instructing a direction of adjustment of the trim position of the trimmable device in one of a trim increase direction or a trim decrease direction;

wherein controlling the variable speed trim actuator includes rotating the trimmable device about the horizontal axis in the direction of adjustment based on the trim rate.

6. The method of claim 1, further comprising:

detecting a vessel acceleration event of the marine vessel; and upon detecting the vessel acceleration event, controlling the variable speed trim actuator to adjust the trim position of the trimmable device at a predefined trim rate until the trimmable device reaches a predetermined trim position or until the vessel acceleration event has ended;

wherein the predefined trim rate is a maximum trim rate and further comprising detecting that the vessel acceleration event has ended when a vessel pitch is less than a threshold vessel pitch and/or a vessel acceleration is less than a threshold vessel acceleration and, thereafter, automatically determining the trim rate based on the vessel speed and/or the rotational speed.

7. The method of claim 1, further comprising detecting that no vessel acceleration event is occurring prior to determining the trim rate based on the rotational speed and/or the vessel speed.

8. The method of claim 1, wherein the trim rate is determined as a function of vessel speed.

9. The method of claim 1, wherein the trim rate is determined as a function of rotational speed and vessel speed.

10. The method of claim 1, further comprising controlling the variable speed trim actuator to move the trimmable device at a maximum rate when the propulsion device is off or stalled.

11. A variable speed trim system on a marine vessel, the system comprising:

a trimmable device;

a variable speed trim actuator configured to rotate the trimmable device about a horizontal axis so as to adjust a trim position of the trimmable device;

a controller configured to:

measure a rotational speed of a propulsion device on the marine vessel and/or a vessel speed of the marine vessel;

determine a trim rate based the vessel speed of the marine vessel and/or the rotational speed of a propulsion device on the marine vessel and a measured trim position of the trimmable device, wherein trim rate specifies a rate of rotation of the trimmable device about the horizontal axis;

wherein the trim rate is determined such that the rate of rotation is less at high vessel speeds and/or high rotational speeds than the rate of rotation at low vessel speeds and/or low rotational speeds; and control the variable speed trim actuator to rotate the trimmable device based on the trim rate so as to adjust a trim position of the trimmable device.

12. The system of claim 11, wherein the controller is configured to decrease the trim rate as the rotational speed and/or the vessel speed increase towards a maximum rotational speed and/or maximum vessel speed, and increase the trim rate as the rotational speed and/or the vessel speed decrease away from the maximum rotational speed and/or the maximum vessel speed.

13. The system of claim 11, wherein the controller is configured to minimize the rate of rotation is at high vessel speeds and high engine speeds and to maximize the rate of rotation at low vessel speeds and low engine speeds.

14. The system of claim 11, further comprising a user input device configured to receive a user input instructing a direction of adjustment of the trim position of the trimmable device in one of a trim increase direction or a trim decrease direction, and wherein the controller is configured to control the variable speed trim actuator so as to rotate the trimmable device about the horizontal axis in the direction of adjustment based on the trim rate.

15. The system of claim 11, wherein the controller is configured to determine the trim rate as a function of rotational speed and vessel speed.

16. The system of claim 11, wherein the controller is further configured to detect that no vessel acceleration event is occurring prior to determining the trim rate based on the rotational speed and/or the vessel speed.

17. The system of claim 11, wherein the controller is configured to determine the trim rate based further on one or more of a measured trim position of the trimmable device, a pitch of the marine vessel, a measured acceleration of the marine vessel, and an operation state of the propulsion device indicating whether a powerhead on the marine vessel is running.

18. A method of controlling trim position of a trimmable device on a marine vessel, the method comprising:

measuring a rotational speed of a propulsion device on the marine vessel and/or a vessel speed of the marine vessel;

determining, at a controller, a trim rate based on the rotational speed and/or the vessel speed such that the trim rate increases incrementally as the vessel speed and/or the rotational speed decreases past a plurality of thresholds and the trim rate decreases as the vessel speed and/or the rotation speed increases past the plurality of thresholds, wherein trim rate specifies a rate of rotation of the trimmable device about a horizontal axis; and controlling a variable speed trim actuator to rotate the trimmable device based on the trim rate to adjust a trim position of the trimmable device.

19. The method of claim 18, further comprising determining the trim rate based on a table that provides trim rate as a function of rotational speed and/or vessel speed.

20. A variable speed trim system on a marine vessel, the system comprising:

a trimmable device;

a variable speed trim actuator configured to rotate the trimmable device about a horizontal axis so as to adjust a trim position of the trimmable device;

a controller configured to:

measure a rotational speed of a propulsion device on the marine vessel and/or a vessel speed of the marine vessel;

determine a trim rate as a function of the vessel speed of the marine vessel and/or the rotational speed of a propulsion device on the marine vessel such that the trim rate increases incrementally as the vessel speed and/or the rotational speed decreases past a plurality of thresholds and the trim rate decreases as the vessel speed and/or the rotation speed increases past the plurality of thresholds, wherein trim rate specifies a rate of rotation of the trimmable device about the horizontal axis; and control the variable speed trim actuator to rotate the trimmable device based on the trim rate to adjust a trim position of the trimmable device.

21. The system of claim 20, further comprising a table stored on a storage device that provides trim rate as a function of rotational speed and/or vessel speed, wherein the controller is configured to determine the trim rate based on the table.

* * * * *